United States Patent
Shao et al.

(10) Patent No.: US 11,890,650 B1
(45) Date of Patent: Feb. 6, 2024

(54) AUTOMATIC BAGGAGE-PACKING DEVICE FOR URBAN TERMINALS BASED ON ARTIFICIAL INTELLIGENCE

(71) Applicants: Beijing Urban Construction Design & Development Group Co., Limited, Beijing (CN); Heptagon 5A Design (Beijing) Co., Ltd, Beijing (CN)

(72) Inventors: Jinyan Shao, Beijing (CN); Yuan Lu, Beijing (CN); Yingjie Li, Beijing (CN); Hewu Lu, Beijing (CN)

(73) Assignees: Beijing Urban Construction Design & Development Group Co., Limited, Beijing (CN); Heptagon 5A Design (Beijing) Co., Ltd., Beijing (CN)

( * ) Notice: Subject to any disclaimer, the term of this patent is extended or adjusted under 35 U.S.C. 154(b) by 0 days.

(21) Appl. No.: 18/219,708

(22) Filed: Jul. 10, 2023

(30) Foreign Application Priority Data

Aug. 8, 2022 (CN) .......................... 202210941216.2

(51) Int. Cl.
| | |
|---|---|
| *B07C 3/06* | (2006.01) |
| *B07C 3/00* | (2006.01) |
| *B65G 47/24* | (2006.01) |
| *B65G 65/32* | (2006.01) |
| *B64F 1/36* | (2017.01) |

(52) U.S. Cl.
CPC ................. *B07C 3/06* (2013.01); *B07C 3/008* (2013.01); *B64F 1/368* (2013.01); *B65G 47/24* (2013.01); *B65G 65/32* (2013.01)

(58) Field of Classification Search
CPC .......... B07C 3/06; B07C 3/008; B64F 1/368; B65G 47/24; B65G 65/32
See application file for complete search history.

(56) References Cited

U.S. PATENT DOCUMENTS

| | | | | |
|---|---|---|---|---|
| 5,967,739 | A * | 10/1999 | Bennison ............... | B66C 23/005 414/744.3 |
| 2011/0095134 | A1* | 4/2011 | Smith ................ | B65D 90/0073 198/804 |

* cited by examiner

*Primary Examiner* — Thomas Randazzo

(57) ABSTRACT

An automatic baggage-packing device for urban terminals based on artificial intelligence is provided. The automatic baggage-packing device includes a baggage transfer rack, baggage transfer rack forms a baggage transfer channel through a transfer stick, baggage transfer rack is equipped with several selectors located above the baggage transfer channel, the selectors are arranged in turn in the extension direction of the baggage transfer channel. The automatic baggage-packing device also includes an automatic loading device set outside of the baggage transfer rack to cooperate with the selectors to load the selected baggage. The invention has the effect of making baggage freight more convenient and quicker in use.

7 Claims, 8 Drawing Sheets

AUTOMATIC BAGGAGE-PACKING DEVICE FOR URBAN TERMINALS BASED ON ARTIFICIAL INTELLIGENCE

CROSS REFERENCE TO RELATED APPLICATIONS

This application is based upon and claims priority to Chinese Patent Application No. 202210941216.2, filed on Aug. 8, 2022, the entire contents of which are incorporated herein by reference.

TECHNICAL FIELD

This application relates to the technical field of logistics automation, in particular to an automatic baggage-packing device for u ban terminals based on artificial intelligence.

BACKGROUND

With the rapid development of the air passenger transport industry, the average daily passenger and freight throughput are also gradually increasing, followed by the increasing demand for baggage check-in and freight transportation, Based on this, urban terminals are currently building in an expanding direction to meet the increasing passenger and freight demand.

In addition to the expansion of the construction of urban airport terminals, because of the corresponding baggage and freight packing speed, baggage and freight unloading efficiency is also urgent to improve; in the process of baggage-packing and transfer in the existing terminal, most of them are manually loaded and unloaded by personnel. The specific operation process is as follows: firstly, the passenger or single piece of baggage on the departure side is transported to the end through the conveyor belt after the security check is completed, and baggage of the same destination is put together; secondly, the operator transports baggage placed together to the periphery of the airplane through unilateral trucks, or transports the arrived baggage to the vicinity of the container; finally, baggage is put into a baggage box at the lower part of the airplane through the operator's code one by one, or transported and placed in baggage box to complete the transfer of baggage arriving at the terminal.

However, there are some technical defects in the above existing terminal baggage or the cargo transfer; in the first aspect, its efficiency is undoubtedly low through the way of personnel handling and putting baggage or goods, with the increase of passenger and freight throughput, it is difficult to achieve the increasing demand of throughput by manual operation. Besides, in the second aspect, the way of manual handling and stacking is difficult to achieve the maximum packing rate. For example, there will be gaps in the process of stacking. Different shapes of baggage or stacking methods of different goods require experienced personnel to be fully placed. It is easy to put baggage stacking codes with different specifications and mismatched shapes and sizes together, which can easily lead to the final baggage or cargo stacking disorder.

Based on this, in order to meet the efficient transfer of baggage or cargo in the terminal, there is room for improvement based on the existing baggage and cargo transfer.

SUMMARY

In order to make baggage freight more convenient and quicker in actual regulation, this application provides an automatic baggage-packing device for urban terminals based on artificial intelligence.

The automatic baggage-packing device for urban terminals based on artificial intelligence provided in this application adopts the following technical solution:

An automatic baggage loading device for urban terminals based on artificial intelligence includes a baggage transfer rack, baggage transfer rack forms a baggage transfer channel through a transfer stick, the baggage transfer rack is equipped with several selectors located above the baggage transfer channel, the selectors are arranged in turn in the extension direction of the baggage transfer channel, it also includes an automatic loading device set outside of the baggage transfer rack to cooperate with the selectors to load the selected baggage:

The selectors includes arc guide plates, limit plates, a connecting rod, a regulating device and a driving cylinder; the arc guide plates are symmetrically installed above the baggage transfer channel, and the side of the arc guide plates which is near the upper end of the baggage transfer channel is far away from each other to form a guide surface; the limit plates is fixedly installed at one end of the arc guide plates away from the guide surface, the arc guide plates and the limit plates cooperate with each other to form a clamping area for clamping baggage; the connecting rod is fixedly installed below the limit plates and extends downward through the baggage transfer channel, the baggage transfer channel is provided with a moving area for moving the connecting rod, the regulating device is arranged between the end of the connecting rod away from the limit plates and the baggage transfer rack, and the driving cylinder is installed between the baggage transfer rack and the regulating device to drive the regulating device to move;

the side wall of the baggage transfer rack is also provided with a conveying device that cooperates with the automatic loading device to transport baggage in the clamping area to the automatic loading device;

By adopting the above technical solution, firstly, baggage or goods of different sizes are regularized together through the automatic selection of the selectors, and the selected baggage or goods are transported to the automatic loading device through the conveying device, finally, the selected and regularized baggage is centralized through the automatic loading device, the whole operation process is carried out automatically, and no additional personnel is required to interfere, which can greatly improve the actual processing efficiency of baggage or goods, moreover, it can ensure that goods of different sizes and types can be automatically regularized to improve the transfer efficiency.

Preferably, the regulating device includes a sliding plate, hinged rods, a limiting rod, a driving tension spring, a telescopic frame and the first pressing switch; the sliding plate is installed on the baggage transfer rack, the connecting rod is installed on the upper surface of the sliding plate, there is a sliding groove on the sliding plate for the connecting rod to slide, the hinged rods are symmetrically and rotatably installed on the side near the bottom of the connecting rod, the limiting rod is installed on the sliding plate and extends upward to the two connecting rods, the hinged rods are set on the limiting rod away from the end of the connecting rod, the driving tension spring is arranged between the two connecting rods to drive the two connecting rods to make sure there is always a tendency for them to move closer to each other, the telescopic frame is fixed on the outside of the connecting rods and extends in the direction of the side wall of the baggage transfer rack, the first pressing switch is set at the extended end of the telescopic frame and controls the transfer stick to stop rotating and the driving cylinder to open and extend.

By adopting the above technical solution, through the setting of the regulating device, the size of baggage itself can independently cooperate with the regulating device to enter into the selectors of different sizes in the actual operation process, and it is transported to the automatic loading device that matches the size of baggage through an option that matches the size of baggage, which realizes the automatic selection of the size of baggage model, and the device is simple and convenient. It does not require the processing of complex electrical signals, which reduces the cost, it can be installed quickly and conveniently, and more convenient for the operators.

Preferably, the conveying device includes a clamping roller, a rotating rod, a driving rod, a driving chain, a rotating wheel, and a resistance plate, the clamping roller is rotatably installed on the side of the limit plates that is close to each other and protrudes on the outer surface of the limit plates to contact with baggage, the rotating rod is rotatably installed on the outside of the limit plates and tilts and extends away from the limit plates, one end of the driving rod is rotatably connected with the extended end of the rotating rod, and the other end is slidingly installed on the outer surface of the limit plates, the driving chain is installed in the limit plates and engages with the outer surface of the clamping roller, the limit plates have an installation groove for the installations of the clamping roller and the driving chain, the end of the driving rod far away from the rotating rod is fixedly connected with the outer surface of the driving chain through the limit plates, the limit plates is provided with a connecting groove for the driving rod to slidingly connect with the installation groove, the rotating wheel is installed at the extended end of the rotating rod, the resistance plate is fixedly installed on the outside of the baggage transfer rack and collides with the rotating wheel;

a rotating block is arranged on the side near the rotating rod and the driving rod, and a connecting tension spring is installed between the two rotating blocks.

By adopting the above technical solution, when the selectors independently select different types of baggage, baggage is directly transported to the position of the conveying device, through the cooperation of the conveying device and the selectors, and still through the drive of the same driving source of the selectors, baggage can be automatically sent to the position of the automatic loading device to reduce the energy, consumption. After the delivery is completed, the device can be automatically reset to ensure the normal delivery of the next baggage.

Preferably, the second pressing switch is arranged on the outer wall of the limit plates to cooperate with the rotating wheel, and the second pressing switch controls the transfer stick to reopen and rotate and drives the cylinder to retract and extend;

a sliding cover on the outer wall of the limit plates is installed on the outer surface of the second pressing switch, the sliding cover is integrated with a guide block facing one side of the limit plates, and the limit plates are provided with a through groove for the guide block to slip, the connection between the inner wall of the sliding cover and the outer wall of the limit plates is equipped with a connecting pressure spring.

By adopting the above technical solution, the second pressing switch and the sliding cover cooperate with each other, which can ensure the automatic reset of the device after the baggage is transported and improve the convenience of actual operation. In addition, the guide block can drive the baggage to run more smoothly to the automatic loading device to prevent baggage from crowding.

Preferably, the automatic loading device includes an aggregate box, a drive motor, a receiving plate, guide plates, and the third pressing switch, the aggregate box is arranged on the side wall of the baggage transfer rack, and its opening corresponds to the position of the limit plates, the drive motor is fixedly installed at the bottom of the aggregate box, the receiving plate is installed in the aggregate box and is connected to the output shaft of the drive motor by a thread, the guide plates are symmetrically and rotatably installed at the opening of the upper end of the aggregate box, the third pressing switch is arranged between the guide plates to control the opening of the drive motor, a torsion spring is arranged between the guide plates and the inner wall of the aggregate box to drive the guide plates to flip up to make sure that the third press switch has always been in a pressed state.

By adopting the above technical solution, when baggage is transported to the position of the automatic loading device, the guide plates will be squeezed first, so that the guide plates will be flipped downward to drive the third pressing switch to open, and the motor will be driven to drive the receiving plate to move downward, so as to realize the gradual collection of baggage, after being collected to the height of baggage, the guide plates will automatically retract until the third pressing switch is pressed again, so as to gradually collect baggage.

Preferably, the bottom of the inner side of the aggregate box is provided with a buffer alarm that cooperates with the receiving plate, the buffer alarm includes a threaded rod, a threaded sleeve, and an acousto-optic alarm switch, and the threaded rod is fixedly installed at the bottom of the inner side of the aggregate box and extended upward, the threaded sleeve is installed ori the threaded rod, and the acousto-optic alarm switch is installed on the upper part of the threaded sleeve.

By using the above technical solution, when the receiving plate drops to the lowest position, that is, after the aggregate box is filled, the setting of the buffer alarm can remind the operators that the items in the aggregate box have been filled, so as to transfer the items in the aggregate box, and after the transfer of the items in the aggregate box, the items have been put to facilitate the following operation.

Preferably, the outer wall of the aggregate box has a discharge port, and the aggregate box is rotatably installed with a transfer plate that cooperates with the discharge port, the side of the transfer plate near the inner cavity of the aggregate box is slidingly installed with a moving plate that contradicts the receiving plate, and the side of the transfer plate near the inner cavity of the aggregate box is also rotatably installed with a moving roller, the bottom of the aggregate box is extended outwardly with a bearing plate, and the upper side of the bearing plate and the side wall of the transfer plate away from the inner cavity of the aggregate box are provided with a hydraulic cylinder.

By adopting the above technical solution, through the setting of the transfer plate, the hydraulic cylinder is used to drive the transfer plate to flip in the actual operation process, so the neatly completed baggage is transported to the container to achieve the effect of rapid baggage transportation through the beating board, thus further improving the convenience of actual operation.

Preferably, the telescopic frame includes an extension plate, thread adjusting rods, rotating sleeves, and an extension rod, the extension plate is fixedly installed on the side wall of the symmetrical limit plates, the thread adjusting rods are rotatably installed on the extension plate, the rotating sleeves are symmetrically installed on the extension plate and is arranged up and down, the first thread part and the second thread part are provided on the thread adjusting rod for the threaded installations of the upper rotating sleeve and the lower rotating sleeve, the thread directions of the first thread part and the second thread part are opposite, the extension rods are rotatably installed on the rotating sleeves respectively, and the extension rod is away from one end of the rotating sleeves.

By adopting the above technical solution, the setting of the telescopic frame can adjust the distance between the first pressing switch and the baggage transfer rack in the actual operation process, so as to adjust the maximum distance that the limit plates can open, and then control the size of baggage selected by the selectors.

In summary, this application includes at least one of the following beneficial technical effects:

1. First of all, baggage or goods of different sizes are neatly arranged together through the automatic selection of the selectors, and the selected baggage or goods are transported to the automatic loading device through the conveying device, and finally, the selected and neatly completed baggage is concentrated through the automatic loading device, the whole operation process is carried out automatically without additional personnel interference, which can greatly improve the actual processing efficiency of baggage or goods, and can ensure that the goods of different sizes and types can be automatically neatly arranged to improve the transfer efficiency.

2. Through the setting of the regulating device, the size of baggage itself can independently cooperate with the regulating device to enter into the selectors of different sizes in the actual operation process, and it is transported to the automatic loading device that matches the size of baggage through an option that matches the size of baggage, which realizes the automatic selection of the size of baggage model, and the device is simple and convenient. It does not require the processing of complex electrical signals, which reduces the cost, it can be installed quickly and conveniently.

3, When baggage is transported to the position of the automatic loading device, the guide plates will be squeezed first, so that the guide plates will be flipped downward to drive the third pressing switch to open, and the motor will be driven to drive the receiving plate to move downward, so as to realize the gradual collection of baggage, after being collected to the height of baggage, the guide plates will automatically retract until the third pressing switch is pressed again, so as to gradually collect baggage.

DETAILED DESCRIPTION OF THE EMBODIMENTS

Figure 1:
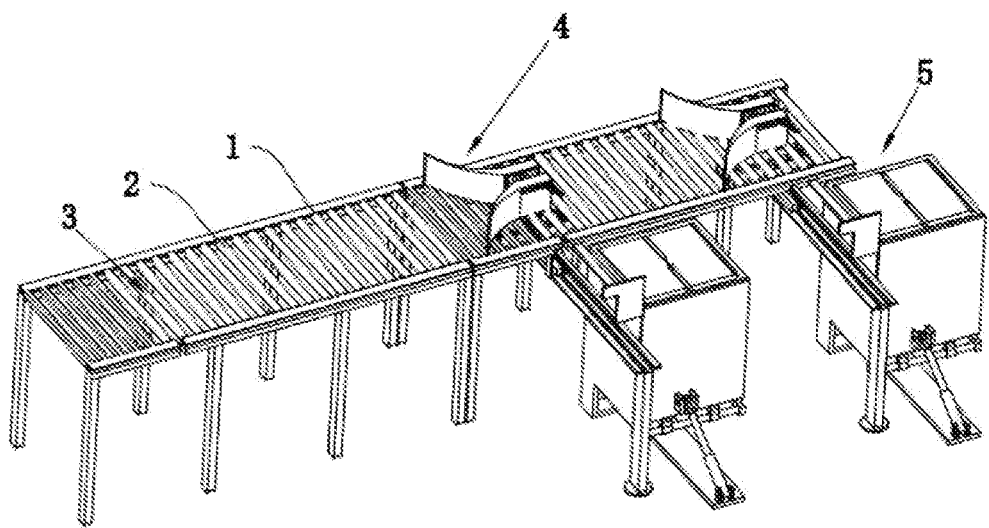
FIG. 1 is an overall structure diagram of this application.
Figure 2:
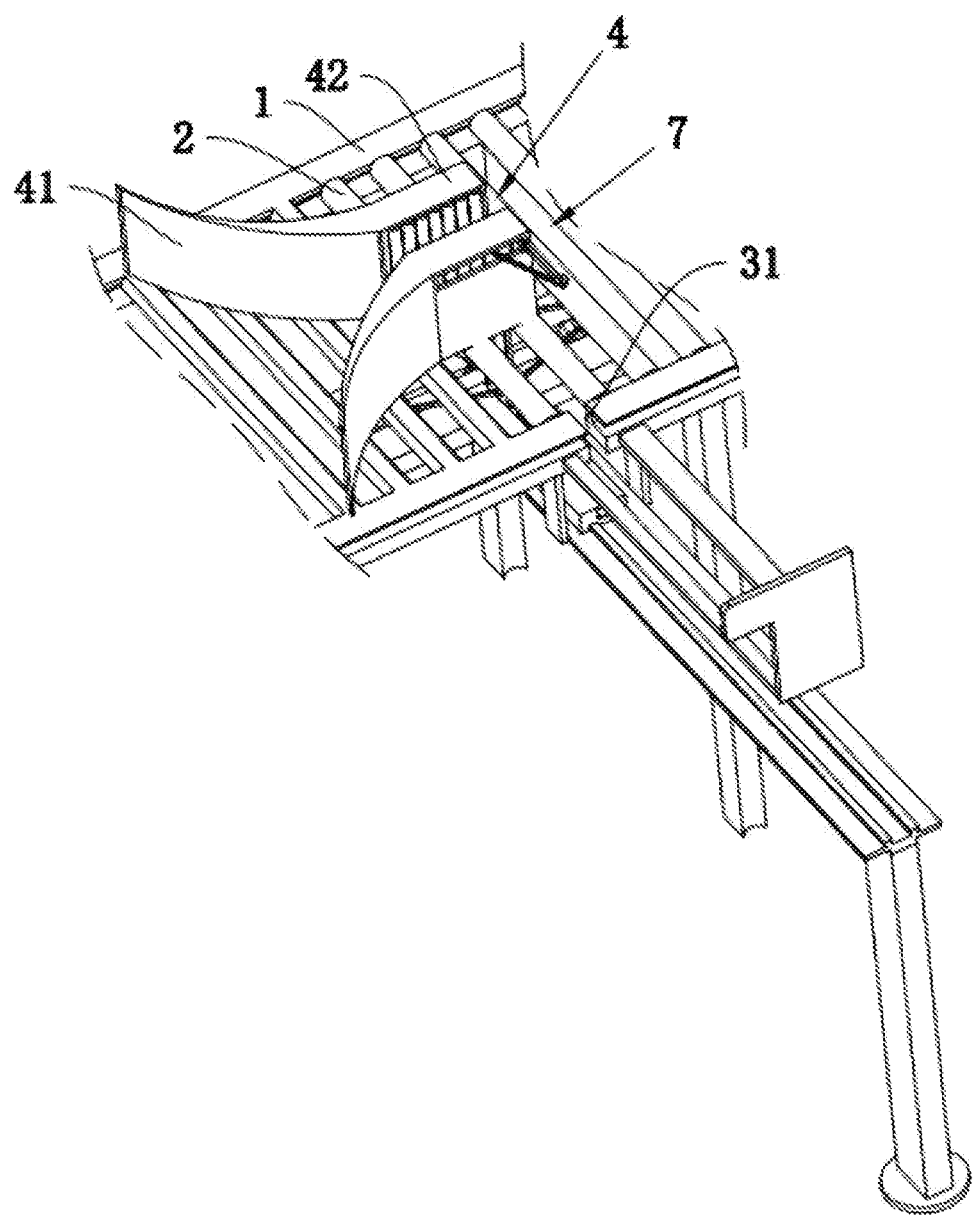
FIG. 2 is a first structure diagram of selectors.

Reference numerals in the FIGS. are as follows: 1, baggage transport rack; 2, transfer stick; 3, baggage transport channel; 4, selector; 5, automatic loading device; 41, arc guide plate; 42, limit plate; 43, connecting rod; 6, adjusting device; 44, driving cylinder; 411, guide surface; 31, moving area; 7, transport device; 61, sliding plate; 62, hinge rod; 63, limit rod; 64, drive tension spring; 65, telescopic frame; 66, the first pressing switch; 611, slip groove; 71, clamping roller; 72, rotating rod; 73, drive rod; 74, drive chain; 75, rotating wheel; 76, resistance plate; 421; installation groove; 422, connected slot; 721, rotating block; 722, connecting spring; 423, the second pressing switch; 51, aggregate box; 52, drive motor; 53, receiving plate; 54, guide plates; 55, the third pressing switch; 8, buffer alarm; 81, screw rod; 82, thread sleeve; 83, acousto-optic alarm switch; 511, discharge port; 512, transfer plate; 513, moving board; 514, moving roller; 515, bearing plate; 516, hydraulic cylinder; 651, extension plate; 652, thread adjusting rod; 653, rotating sleeve; 654, extension rod.

The following is a further explanation of this application in combination with FIGS. 1-9.

This embodiment of this application discloses an automatic baggage-packing device for urban terminals based on artificial intelligence, which can automatically regularize baggage cargo during operation, reduce personnel's participation in handling, and improve the efficiency of actual operation.

Referring to FIG. 1, an automatic baggage-packing device for urban terminals based on artificial intelligence includes a baggage transfer rack 1, the baggage transfer rack 1 forms the baggage transfer channel 3 through transfer stick 2, the transfer roller rotates under the control of the motor when baggage is transferred to transfer stick 2, it can move forward with the rotation of transfer stick 2; for selecting baggage of different sizes, baggage transfer rack 1 is equipped with several selectors 4 located above baggage transfer channel 3, selectors 4 are arranged in turn in the extension direction of baggage transfer channel 3, in this embodiment, selectors 4 which are arranged in turn can select baggage from large one to small one after large baggage is selected and transferred by selectors 4 in front, small baggage is selected again by selectors 4 in the rear. In addition, when selectors 4 select baggage boxes of different sizes, automatic loading device 5 is set up on the outer side of baggage transfer rack 1 to cooperate with selectors 4 to load baggage boxes after the selection, baggage boxes are quickly regularized by the loading of automatic loading device 5, and finally, different types of baggage boxes are transported to containers or airplane. The operation process reduces the additional interference of personnel and improves the convenience of the actual operation.

Figure 3:
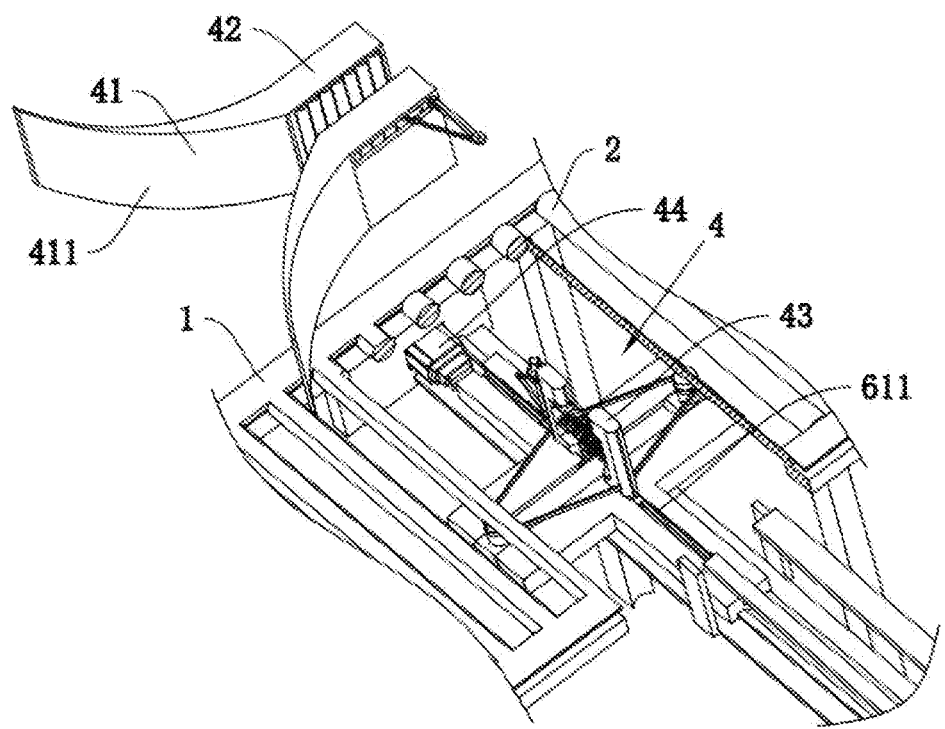
FIG. 3 is a second structure diagram of selectors.

Referring to MG 2 and FIG. 3, the structure of selectors 4 in this embodiment is shown, specifically, selectors 4 include arc guide plates 41, limit plates 42, connecting rod 43, regulating device 6 and driving cylinder 44; arc guide plates 41 are set with two pieces, and they are symmetrically installed above baggage transport channel 3, and the side of arc guide plates 41 near the upper end of baggage transport channel 3 is far away from each other to form guide surface 411, limit plates 42 is fixedly installed at one end of arc guide plates 41 away from guide surface 411, and arc guide plates 41 and limit plates 42 cooperate to form a clamping area for clamping baggage, when baggage in baggage transfer channel 3 moves through guide surface 411 to the clamping area position, the size of baggage will squeeze arc guide plates 41 and limit plates 42, driving limit plates 42 and arc guide plates 41 away from each other, until baggage is clamped through limit plates 42 and arc guide plates 41, the clamping is realized in the following description.

Connecting rod 43 is fixedly installed under limit plates 42 and extended downward through baggage transport channel 3, moving area 31 is set for the movement of connecting rod 43 on baggage transport channel 3, when limit plates 42 are far away from each other, connecting rod 43 located below will also move together, regulating device 6 is set between the end of connecting rod 43 away from limit plates 42 and baggage transfer rack 1, and driving cylinder 44 is installed between baggage transfer rack 1 and regulating device 6 to drive regulating device 6 to move. When baggage moves to the position of the clamping area in the actual operation, if the size of baggage reaches the required size, regulating device 6 will control driving cylinder 44 to open, and opened driving cylinder 44 will drive limit plates 42 and arc guide plates 41 holding baggage to move to the position of automatic loading device 5, and automatic loading device 5 is finally used for automatic stacking loading. It should be noted that regulating device 6 controls the maximum actual size of baggage allowed to pass through the clamping area, that is, when the actual baggage exceeds the maximum size allowed after adjustment, regulating device 6 will control the driving cylinder 44 to work and control transfer stick 2 to stop rotating.

Figure 4:
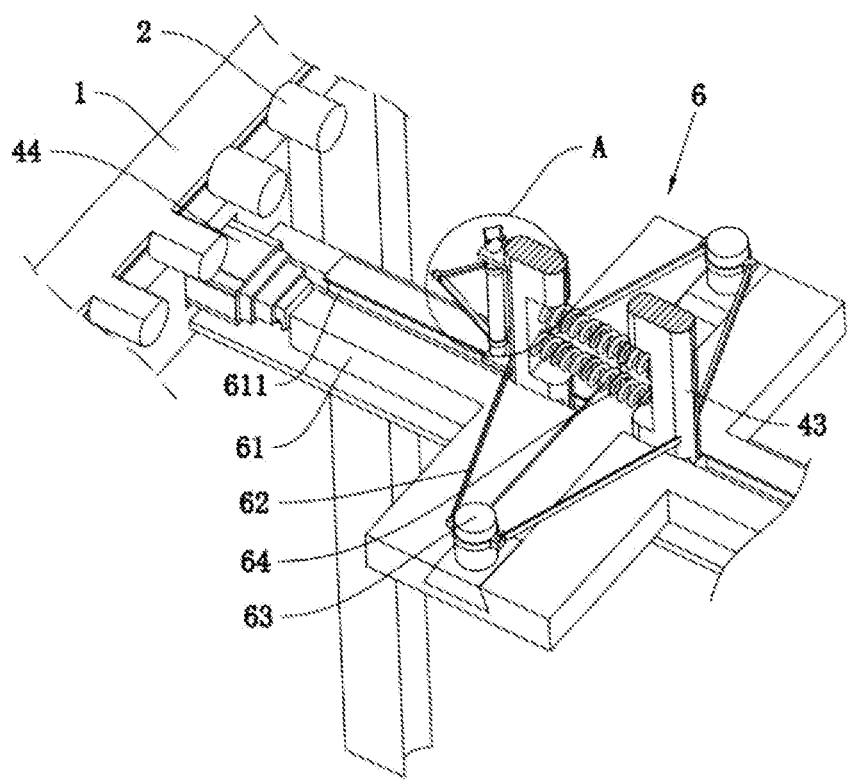
FIG. 4 is a structure diagram of the regulating device.
Figure 5:
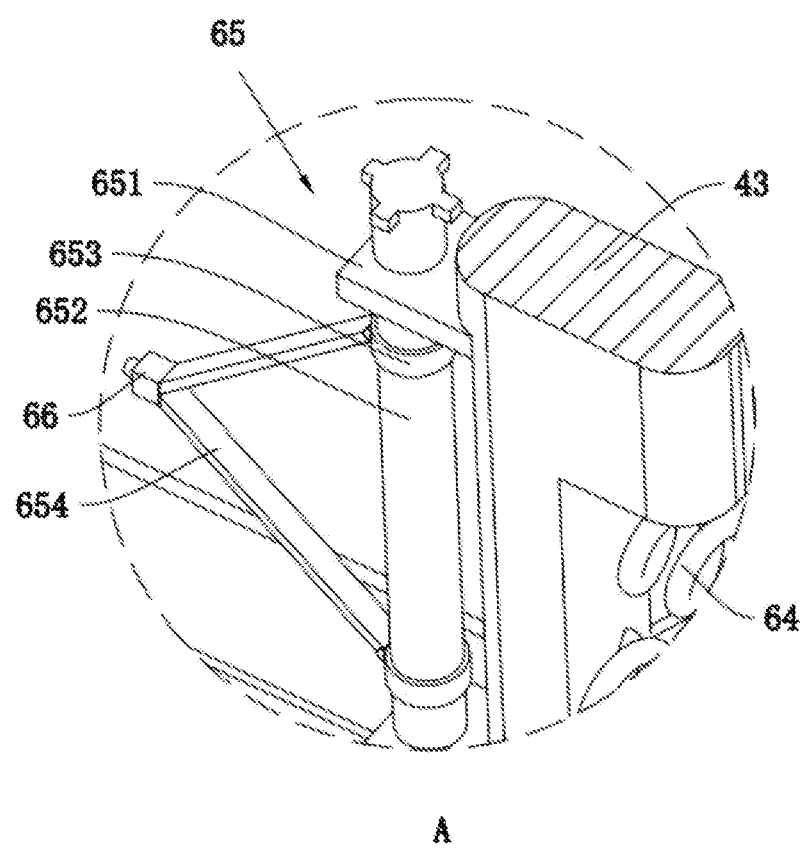
FIG. 5 is an enlarged diagram of Part A in FIG. 4.

Referring to FIG. 4 and FIG. 5, the specific structure of regulating device 6 is shown in this embodiment to facilitate the adjustment of the size of baggage allowed through the clamping area; regulating device 6 includes sliding plate 61, hinge rod 62, limit rod 63, driving tension spring 64, telescopic frame 65 and the first press switch 66, specifically, sliding plate 61 is installed on baggage transfer rack 1, and sliding plate 61 is connected with the extended end of driving cylinder 44, connecting rod 43 is slidingly installed on the upper surface of sliding plate 61, and sliding groove 611 is provided on sliding plate 61 for the sliding of connecting rod 43, that is, when driving cylinder 44 drives sliding plate 61 to move, it can drive connecting rod 43 and limit plates 42 located above sliding plate 61 to move together for driving baggage in the clamping area to move together.

Hinged rod 62 is symmetrically and rotatably installed at the bottom of connecting rod 43, limit rod 63 is installed on sliding plate 61 and extends upward to two connecting rods 43, and the end of hinged rod 62 away from connecting rod 43 is set on limit rod 63, driving tension spring 64 is set between two connecting rods 43 to drive two connecting rods 43 to make sure there: is always a tendency for them to move closer to each other. Therefore, in the actual operation process, when baggage moves between two limit plates 42 and drives limit plates 42 to be separated from each other, it will drive connecting rod 43 to move and separate, thus driving the angle between hinged rod 62 to become larger. Due to the cooperation of limit rod 63 and hinged rod 62, it is possible to drive two limit plates 42 to move synchronously; in addition, to ensure that baggage can always be in the middle position of two limit plates 42, a rolling ball is set on the outer surface of limit plates 42 near each other, that is, when baggage box moves to the middle of limit plates 42, it can automatically swing left and right to make sure baggage box is in the middle position of limit plates 42.

Continuing to refer to FIG. 4 and FIG. 5, telescopic frame 65 is fixed on the outside of connecting rods 43 and extends towards the side wall of baggage transfer rack 1 the first pressing switch 66 is set at the extended end of telescopic frame 65 and controls transfer stick 2 to stop rotation and drive cylinder 44 to open and extend, in this embodiment, telescopic frame 65 includes extension plates 651, thread adjusting rod 652, rotating sleeves 653 and extension rods 654; in this embodiment, extension plates 651 are set up with two blocks, and is symmetrically installed on the side wall of connecting rod 43, thread adjusting rod 652 is rotatably installed between extension plates 651, and rotating sleeves 653 are also symmetrically set up with two groups, and it is threaded installed on thread adjusting rod 652 and it is setting up and down, and thread adjusting rod 652 is provided with the first thread part and the second thread part for the threaded installations of upper and lower rotating sleeves 653, The first thread part is opposite to the second thread part thread, that is, it can control two rotating sleeves 653 moving up and down close to each other or away from each other when rotating thread adjusting rod 652; extension rods 654 is installed on rotating sleeve 653 respectively, and extension rods 654 away from one end of rotating sleeve 653 is rotatably installed, the first press switch 66 is installed at the hinge of two extension rod 654.

In the process of actual operation, the rotation of thread adjusting rod 652 makes two thread sleeves 82 away from each other, therefore, when there is no baggage entering the clamping area, the distance between the first pressing switch 66 and the side wall of baggage transfer rack 1 is greater; when baggage enters between two limit plates 42, limit plates 42 are driven away, which drive the first pressing switch 66 to collide with the side wall of baggage transfer rack 1; when the first pressing switch 66 opens, transfer stick 2 stops rotating, and driving cylinder 44 extends outward, and baggage is driven outward together by limit plates 42, moreover, when the distance between two rotating sleeves 653 is smaller, the items allowed to be clamped is larger, and vice versa.

Figure 6:
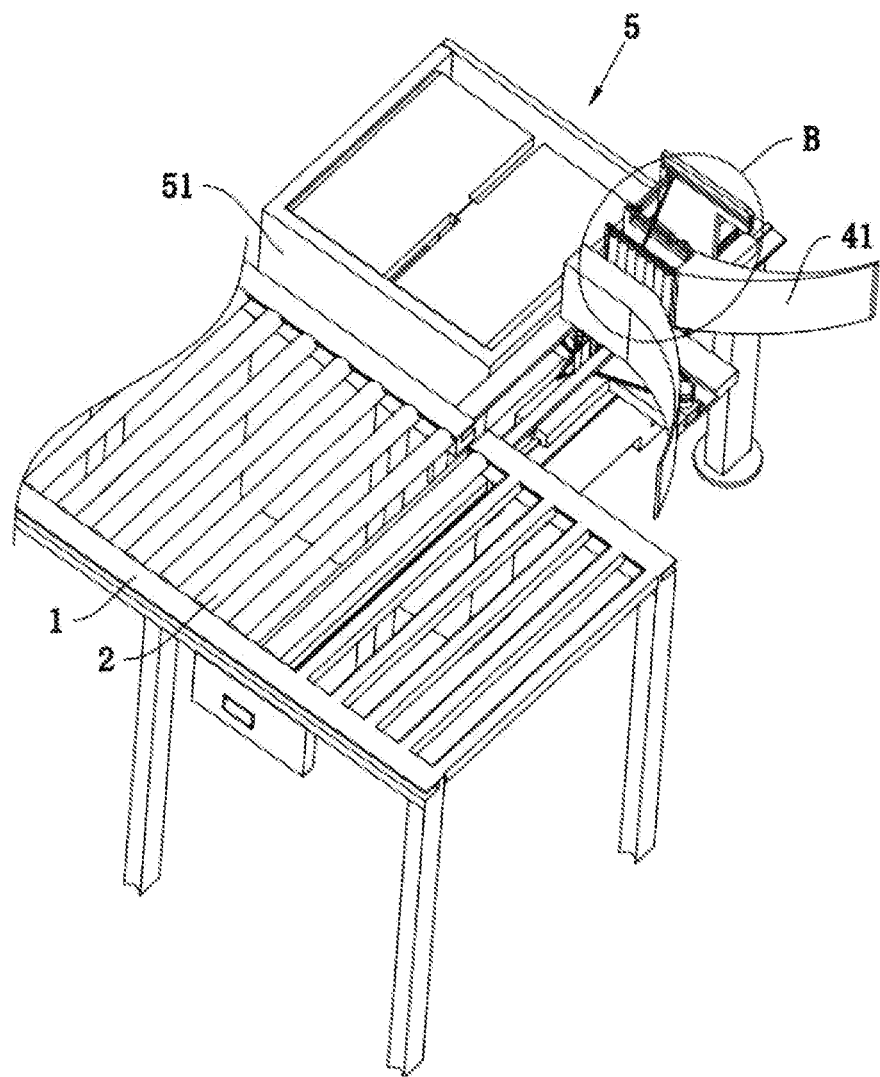
FIG. 6 is a position diagram of the conveying device.
Figure 7:
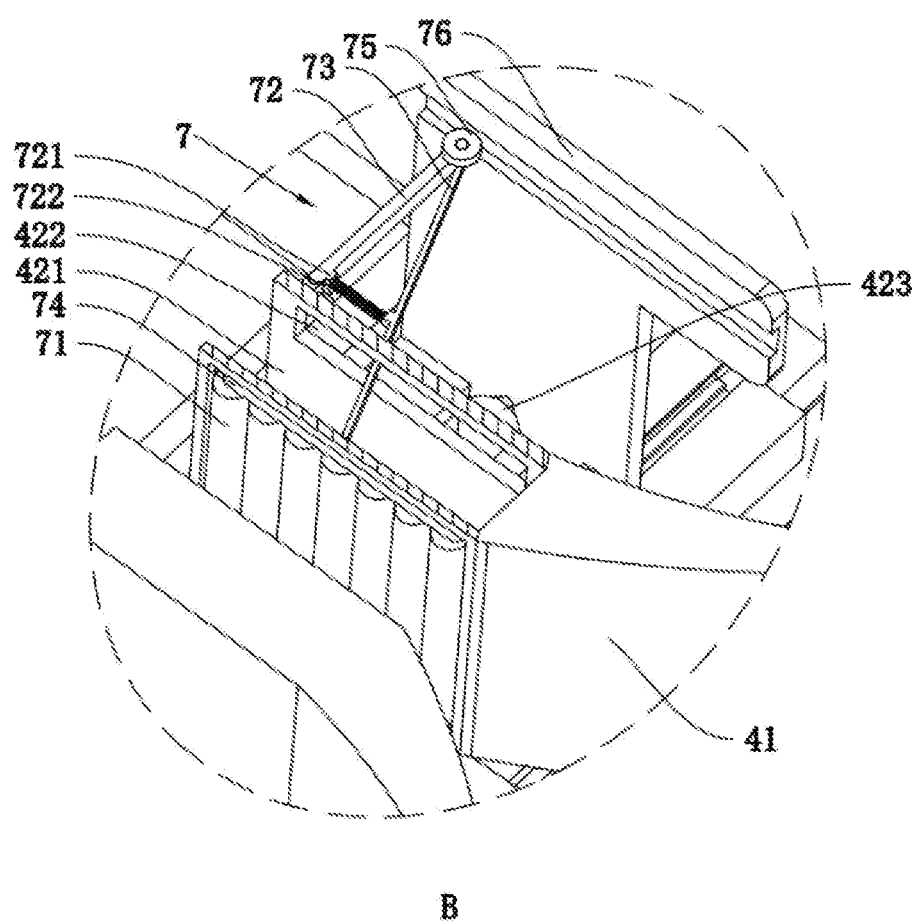
FIG. 7 is an enlarged diagram of part B in FIG. 6.

Referring to FIG. 6 and FIG. 7, when limit plates 42 are driven by the driving cylinder 44 to move to the outside of baggage transfer channel 3, baggage can be moved to automatic loading device 5 more conveniently and automatically. In this embodiment, the side wall of baggage transfer rack 1 is also equipped with transport device 7 that cooperates with automatic loading device 5 to transport baggage in the clamping area to automatic loading device 5.

Specifically, conveying device 7 includes clamping roller 71, rotating rod 72, driving rod 73, driving chain 74, rotating wheel 75, and resistance plate 76, clamping roller 71 is rotatably installed on the side of limit plates 42 that is close to each other and protrudes on the outer surface of limit plates 42 to contact baggage, rotating rod 72 is rotatably installed on the outer side of limit plates 42 and tilts away from limit plates 42. One end of driving rod 73 is rotatably connected with the extended end of rotating rod 72. The other end is slidingly installed on the outer surface of limit plates 42, driving chain 74 is installed in limit plates 42 and engages with the outer surface of clamping roller 71, there is installation groove 421 for clamping roller 71 and driving chain 74 on limit plates 42, the end of driving rod 73 away from rotating rod 72 passes through limit plates 42 and is fixedly connected with the outer surface of driving chain 74, there is connecting slot 422 for driving rod 73 to slidingly connect with installation groove 421 on limit plates 42, rotating wheel 75 is rotatably installed at the extended end of rotating rod 72, resistance plate 76 is fixedly installed on the outside of baggage transfer rack 1 and collides with rotating wheel 75, rotating block 721 is arranged on the side near of rotating rod 72 and driving rod 73, and connecting spring 722 is arranged between two rotating blocks 721.

In the process of actual operation, driving cylinder 44 drives limit plates 42 to move, which drives baggage to move to the position of conveying device 7, and rotating wheel 75 will collide with resistance plate 76, under the further drive of driving cylinder 44, the angle between rotating rod 72 and driving rod 73 will increase, and the end of driving rod 73 away from rotating rod 72 will slide on limit plates 42, and then it drives the chain to rotate through the drive of driving rod 73, which drives baggage in the clamping area to slide outward to automatic loading device 5, to realize the automatic loading operation of baggage.

Referring to FIG. 7, the second pressing switch 423 is set on the outer wall of limit plates 42, which is matched with rotating wheel 75, the second pressing switch 423 controls transfer stick 2 to reopen the rotation and drives cylinder 44 to retract. That is, when baggage moves to automatic loading device 5, rotating wheel 75 will press the second pressing switch 423, thereby controlling driving cylinder 44 to retract, and the synchronous transfer stick 2 will also open and rotate synchronously to transfer the next baggage.

Figure 8:
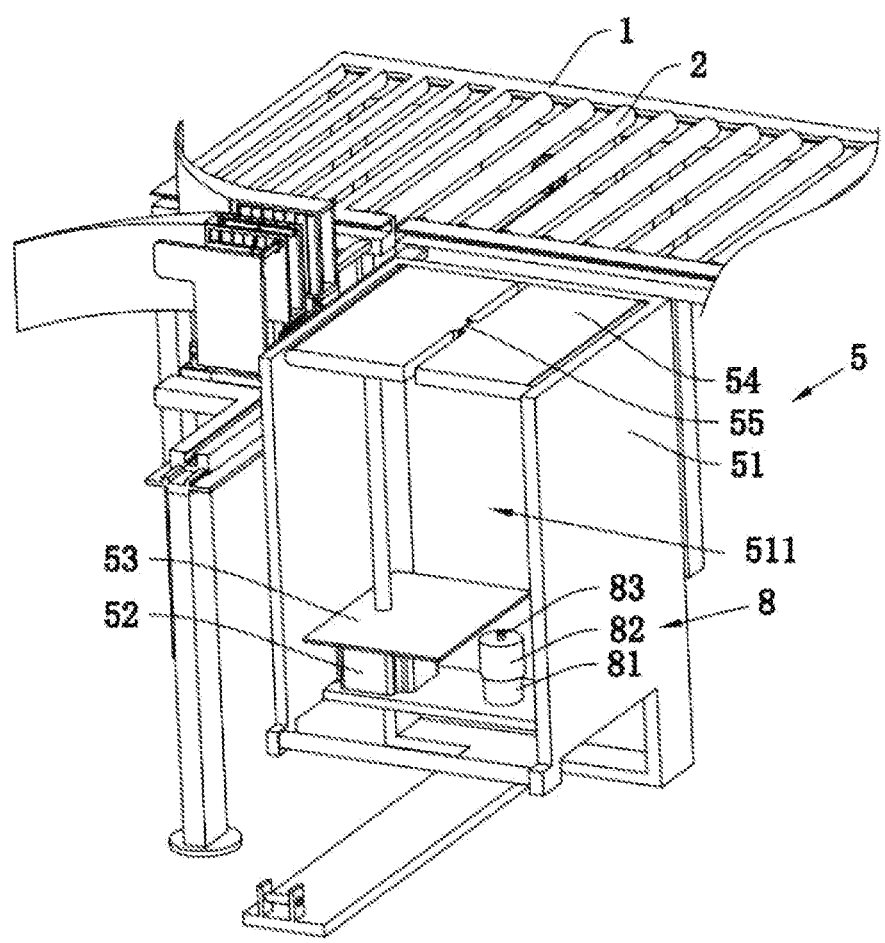
FIG. 8 is a structure diagram of the automatic loading device.

Referring to FIG. 8, the structure of automatic loading device 5 in this embodiment is shown, specifically, automatic loading device 5 in this embodiment includes aggregate box 51, drive motor 52, receiving plate 53, guide plates 54, and the third pressing switch 55; aggregate box 51 is set on the side wall of baggage transfer rack 1. In this embodiment, aggregate box 51 is a rectangular hollow, and its size can be applied to the size of baggage box after the selection of selectors 4, and its opening corresponds to the position of limit plates 42, so baggage moving down from limit plates 42 will move to the opening of aggregate box 51.

Drive motor 52 is fixedly installed at the bottom of aggregate box 51, and receiving plate 53 is slidingly installed in aggregate box 51 and is connected with the thread of the output shaft of drive motor 52, therefore, through the control of drive motor 52, the rise and fall of receiving plate 53 can be controlled, specifically, when baggage box enters the opening of aggregate box 51, baggage can be caught by receiving plate 53, and then through the control of drive motor 52, receiving plate 53 and baggage on receiving plate 53 are gradually moved downward, when receiving plate 53 moves to the lowest position of aggregate box 51, baggage in aggregate box 51 can be fully loaded.

Guide plates 54 are symmetrically and rotatably installed at the opening of the upper end of aggregate box 51, the third pressing switch 55 is set between guide plates 54 to control the opening of drive motor 52, a spring is set between guide plates 54 and the inner wall of aggregate box 51 to drive guide plates 54 to turn up to make sure the third pressing switch 55 is in a compressed state.

In the actual operation process, baggage moves to the position of guide plates 54, and guide plates 54 are squeezed, so that two guide plates 54 are far away from each other, then the third pressing switch 55 is turned on. At the same time, drive motor 52 opens and drives receiving plate 53 to move down, when baggage on receiving plate 53 and baggage on receiving plate 53 don't block guide plates 54, guide plates 54 reset until the third pressing switch 55 is closed, and drive motor 52 stops rotating until the next baggage falls, repeating the above steps to ensure that baggage in aggregate box 51 is filled.

Continuing to refer to FIG. 8, in order to remind the operator that baggage in aggregate box 51 is full, buffer alarm 8 is set at the bottom of the inside of aggregate box 51, which cooperates with receiving plate 53, in this embodiment, buffer alarm 8 includes screw rod 81, screw sleeve 82 and acousto-optic alarm switch 83, screw rod 81 is fixedly installed at the bottom of the inside of aggregate box 51 and extends upward, screw sleeve 82 is threaded installed on screw rod 81, and acousto-optic alarm switch 83 is installed on the upper part of screw sleeve 82 when receiving plate 53 contacts acousto-optic alarm switch 83, the operator can know that aggregate box 51 is full, and then baggage in aggregate box 51 can be transferred outward.

Figure 9:
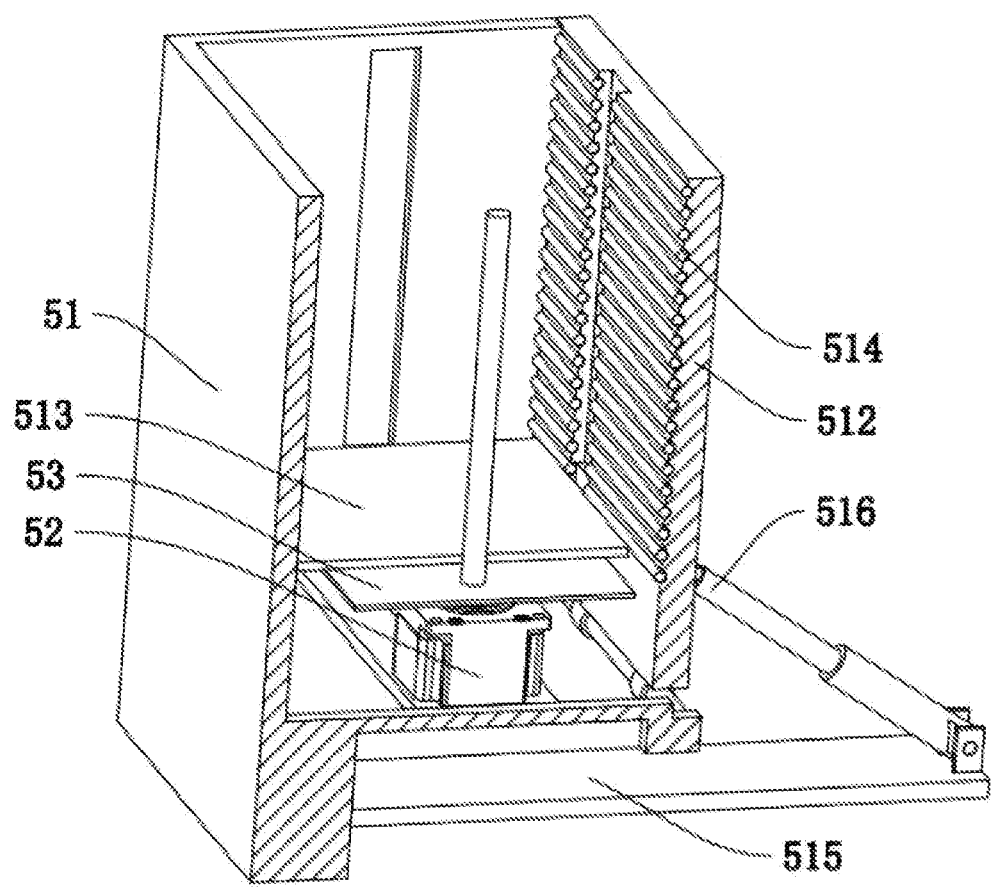
FIG. 9 is a structure diagram of the transfer plate.

Referring to FIG. 1 and FIG. 9, in order to facilitate the transfer of baggage materials in aggregate box 51, aggregate box 51 is set as an active structure in this embodiment, specifically, there is discharge port 511 on the outer wall of aggregate box 51, and aggregate box 51 is rotatably installed with transfer plate 512 that cooperates with discharge port 511, transfer plate 512 is slipped near the side of the inner cavity of aggregate box 51 and installed with moving plate 513 that contradicts receiving plate 53, and transfer plate 512 is also rotatably installed on the side of the inner cavity of aggregate box 51 with moving roller 514, hydraulic cylinder 516 is arranged on the side wall of the upper side of bearing plate 515 and the side wall of transfer plate 512 away from the inner cavity of aggregate box 51.

When baggage in aggregate box 51 needs to be transferred outward, hydraulic cylinder 516 is opened, so that transfer plate 512 flips outward, driven by the receiving plate 515, baggage in aggregate box 51 can be turned outward together. When transfer plate 512 flips, baggage is pushed outward through receiving plate 515.

The embodiment of the specific implementation method is a better embodiment of the invention, and it does not limit the protected range of the invention. Therefore, all the equivalent changes made according to the structure, shape, and principle of the invention should be covered within the protection scope of the invention.

What is claimed is:

1. An automatic baggage-packing device for urban terminals based on artificial intelligence, comprising:
   a baggage transfer rack including:
      transfer sticks that form a baggage transfer channel,
      a plurality of selectors located above the baggage transfer channel, wherein the selectors are arranged in turn in an extension direction of the baggage transfer channel; and
   an automatic loading device set outside the baggage transfer rack to cooperate with the selectors to load selected baggage,
   wherein each of the plurality of selectors comprises:
      a pair of arc guide plates,
      a pair of limit plates,
      a pair of connecting rods,
      a regulating device, and
      a driving cylinder, wherein the pair of arc guide plates are symmetrically installed above the baggage transfer channel, and a side of each arc guide plate which is near the upper end of the baggage transfer channel extends away from each other to form a guide surface; each limit plate is fixedly installed at one end of a corresponding arc guide plate away from the guide surface end, the arc guide plates and the limit plates cooperate with each other to form a clamping area configured to clamp baggage; each connecting rod is fixedly installed below the limit plates and extends downward through the baggage transfer channel, the baggage transfer channel is provided with a moving area for moving each connecting rod, the regulating device is arranged between an end of one of the connecting rod that extends away from the limit plates and the baggage transfer rack, and the driving cylinder is installed between the baggage transfer rack and the regulating device to drive the regulating device to move;

wherein a side wall of the baggage transfer rack comprises a conveying device that cooperates with the automatic loading device to transport baggage in the clamping area to the automatic loading device;

wherein the regulating device comprises:
a sliding plate,
a plurality of hinged rods,
a pair of limiting rods,
a driving tension spring,
a telescopic frame, and
a first pressing switch, wherein the sliding plate is installed on the baggage transfer rack, each connecting rod is installed on an upper surface of the sliding plate, there is a sliding groove on the sliding plate for the connecting rods to slide through, each hinged rod is symmetrically and rotatably attached on a side and near a bottom of each connecting rod, each limiting rod is installed on the sliding plate and extends upward to the two connecting rods, each hinged rod is set on one of the limiting rods at an end of each hinged rod that extends away from of the connecting rod it respectively attached to, the driving tension spring is arranged between the pair of connecting rods to drive the pair connecting rods to drive them to move closer to each other, the telescopic frame is fixed on an outside of one of the connecting rods and extends in a direction towards the side wall of the baggage transfer rack, the first pressing switch is set at a distal end of the telescopic frame and controls the transfer sticks to stop rotating and the driving cylinder to open and extend.

2. The automatic baggage-packing device for urban terminals based on artificial intelligence according to claim 1, wherein the conveying device of the baggage transfer rack comprises:
plurality of clamping rollers,
a rotating rod,
a driving rod,
a driving chain,
a rotating wheel,
a resistance plate, wherein each clamping roller of the plurality of clamping rollers is rotatably installed on a side of a respective limit plate of that faces the other limit plate of the pair of limit plates, and each clamping roller protrudes on an outer surface of the limit plates and is configured to contact with baggage, the rotating rod is rotatably installed on the outside of a limit plate of the pair of limit plates and tilts and extends away from the limit plate, one end of the driving rod is rotatably connected with the extended end of the rotating rod, and the another end of the driving rod is slidingly installed on an outer surface of the limit plate, the driving chain is installed in each limit plate and engages with the outer surface of the clamping rollers, each limit plate has an installation groove for the installations of the clamping roller and the driving chain, the end of the driving rod distal from the rotating rod is fixedly connected with an outer surface of the driving chain through one of the limit plates, the limit plate is provided with a connecting groove for the driving rod to slidingly connect with the installation groove, the rotating wheel is installed at a distal end of the rotating rod, the resistance plate is fixedly installed on the outside of the baggage transfer rack and collides with the rotating wheel, and
a pair of rotating blocks that is arranged between the rotating rod and the driving rod, wherein a connecting tension spring is installed between the rotating blocks of the pair of rotating blocks.

3. The automatic baggage-packing device for urban terminals based on artificial intelligence according to claim 2, wherein the plurality of selectors comprises:
a second pressing switch arranged on an outer wall of the limit plates to cooperate with the rotating wheel, wherein the second pressing switch controls the transfer sticks to reopen and rotate and drives the cylinder to retract and extend.

4. The automatic baggage-packing device for urban terminals based on artificial intelligence according to claim 1, wherein the automatic loading device comprises:
an aggregate box,
a drive motor,
a receiving plate,
a pair of guide plates, and
a third pressing switch, wherein the aggregate box is arranged on the side wall of the baggage transfer rack, and an opening of the aggregate box corresponds to the position of the limit plates, the drive motor is fixedly installed at the bottom of the aggregate box, the receiving plate is installed in the aggregate box and is connected to the output shaft of the drive motor by threaded connection, the pair of guide plates are symmetrically and rotatably installed at the opening of the upper end of the aggregate box, the third pressing switch is arranged between the pair of guide plates to control the opening of the drive motor, a torsion spring is arranged between the pair of guide plates and the inner wall of the aggregate box to drive the guide plates to flip up to make sure that the third press switch is normally in a compressed state.

5. The automatic baggage-packing device for urban terminals based on artificial intelligence according to claim 4, wherein a bottom of an inner side of the aggregate box comprises:
a buffer alarm that cooperates with the receiving plate, the buffer alarm includes:
a threaded rod,
a threaded sleeve, and
an acousto-optic alarm switch, wherein the threaded rod is fixedly installed at the bottom of the inner side of the aggregate box and extended upward, the threaded sleeve is installed on the threaded rod, and the acousto-optic alarm switch is installed on an upper part of the threaded sleeve.

6. The automatic baggage-packing device for urban terminals based on artificial intelligence according to claim 4, wherein the aggregate box comprises:
a discharge port at an outer wall of the aggregate box, and
a transfer plate that is rotatably installed on the aggregate box and cooperates with the discharge port, wherein a side of the transfer plate facing an inner cavity of the aggregate box is slidingly installed with a moving plate that contradicts the receiving plate, and the side of the transfer plate facing the inner cavity of the aggregate box is also rotatably installed with a moving roller, the bottom of the aggregate box is extended outwardly with a bearing plate, and an upper side of the bearing plate and a side wall of the transfer plate facing away from the inner cavity of the aggregate box are provided with a hydraulic cylinder.

7. The automatic baggage-packing device for urban terminals based on artificial intelligence according to claim 1, wherein the telescopic frame comprises:

an extension plate,
thread adjusting rods,
upper and lower rotating sleeves, and
a pair of extension rods, wherein the extension plate is fixedly installed on a side wall of the pair of limit plates, the thread adjusting rods are rotatably installed on the extension plate, the upper and lower rotating sleeves are symmetrically installed on the extension plate and are arranged vertically, a first thread part and a second thread part are provided on the thread adjusting rod for the threaded installations of the upper rotating sleeve and the lower rotating sleeve, the thread directions of the first thread part and the second thread part are opposite, each extension rod is rotatably installed on an upper or lower rotating sleeve respectively, and each extension rod extends away from an end of the respective rotating sleeve.

\* \* \* \* \*